April 25, 1961  J. W. MOMBERG ET AL  2,981,880
SPEED-REGULATING CONTROL SYSTEM FOR SERIES COMMUTATOR MOTOR
Filed Dec. 23, 1959
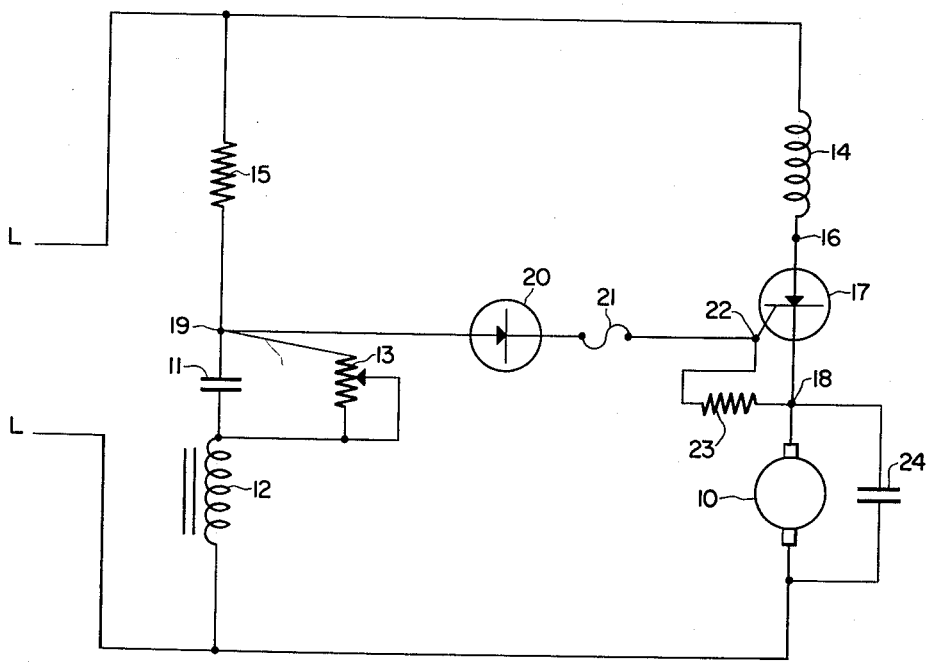
WITNESS
William Martins
INVENTORS
James W. Momberg
Edward W. Taylor
BY Marshall J. Breen
ATTORNEY

United States Patent Office 2,981,880
Patented Apr. 25, 1961

2,981,880

SPEED-REGULATING CONTROL SYSTEM FOR SERIES COMMUTATOR MOTOR

James W. Momberg, Somerville, and Edward W. Taylor, Martinsville, N.J., assignors to The Singer Manufacturing Company, Elizabeth, N.J., a corporation of New Jersey Filed Dec. 23, 1959, Ser. No. 861,530
4 Claims. (Cl. 318—246)

This invention relates to a system using a solid state controlled rectifier for regulating the speed of series commutator motors.

A circuit using a solid state controlled rectifier for regulating the speed of series commutator motors has been shown and described in United States patent application Serial No. 814,626, filed May 20, 1959, now United States Patent No. 2,939,064. While this prior circuit is satisfactory for most applications to motors with up to 50 watts full load output, its regulating range falls off as motors of larger outputs are employed.

The present invention may be considered as an extension of and improvement over that of the above noted embodiment.

It is an object of this invention to provide a speed-responsive regulating system for series commutator motors which shall have good speed regulation over a wider speed range than heretofore.

With the above and other objects in view as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

In the drawing, the sole figure is a schematic diagram of a circuit comprising the invention.

It will be noted that basically the bridge circuit of the above-mentioned United States Patent 2,939,064 is used. However, the leg of the bridge adjacent to that containing the motor armature 10 comprises a series resonant LC circuit made up of a capacitor 11 and an inductance 12 with a variable resistor 13 shunting the capacitor 11. The field winding 14 is connected to one end of a fixed resistor 15 and one side of a source of A.C. voltage L—L. The other end of the field winding 14 is connected to the anode terminal 16 of a solid state rectifier 17.

The armature 10 has one end connected to the cathode terminal 18 of the rectifier 17, the other end being connected to the inductance 12 and one side of the line L—L as shown.

Connected to a common junction 19 between resistor 15, capacitor 11 and variable resistor 13, is a crystal diode 20 which connects through a protective fuse 21 to the gate terminal 22 of the rectifier 17.

A resistor 23 is connected from the gate terminal 22 to the cathode terminal 18 to lower the input impedance of the gate circuit to render it less sensitive to triggering from random noise voltages. A capacitor 24 is shunted across the armature to isolate the noise voltages incident to commutation sparking and prevent misfiring of the rectifier 17.

The values of the capacitor 11 and the inductance 12 are chosen to be series resonant substantially at the frequency of the line voltage. Phase shift is controlled by the variable resistor 13 which thus serves as a speed-setting control. It has been found that substantially 180 degrees of phase shift can be obtained by this circuit which accounts for its wide range of good speed regulation.

In a practical embodiment of this circuit the following specific elements were employed:

Capacitor 11_____ 0.72 mfd.—400 volts.
Inductance 12_____ 10 henry choke.
Variable Resistor 13___ 10,000 ohm—3 watt pot.
Resistor 15_____ 4000 ohm—5 watt.
Resistor 23_____ 500 ohm—1 watt.
Capacitor 24_____ 0.02 mfd.—400 volts.
Diode 20_____ Sarkes-Tarzian F–6.
Rectifier 17_____ General Electric C35B
(silicon controlled rectifier).

It will be understood that resistor 23 and capacitor 24 are not essential to the basic operation of the circuit of this invention but are included in the embodiment shown as practical means of improving the circuit reliability by discriminating against misfiring of the rectifier by random voltages.

Having thus described the nature of this invention, what we claim herein is:

1. A speed regulating system for a commutator motor having series-connected field and armature windings fed from a source of A.C. voltage, comprising a bridge circuit having a fixed resistor for one leg, the field winding for a second leg, the armature winding for a third leg, and a fourth leg having a capacitor and an inductance in series and tuned to resonance at the frequency of the voltage source with a variable resistor connected in shunt with the capacitor, and a solid state controlled rectifier having its anode terminal connected to the field winding, its cathode terminal connected to the armature winding and its gate terminal connected through a diode to the common junction of the fixed resistor, capacitor and variable resistor.

2. In a speed regulating system for a commutator motor having series-connected field and armature windings, a source of A.C. voltage, a solid state controlled rectifier, a first series circuit connected across the A.C. voltage source comprising the field winding, the anode cathode circuit of the solid state rectifier and the armature winding, a second series circuit connected across the A.C. voltage source comprising a fixed resistor in series with a capacitor and an inductance tuned to resonance at the frequency of the A.C. voltage source with a variable resistor connected in shunt with the capacitor, and a diode connected between the common junction of the fixed resistor and the capacitor and the gate terminal of the solid state rectifier, the fixed resistor and the field winding having a common connection with one side of the A.C. voltage source.

3. A speed regulating system for a commutator motor having series-connected field and armature windings, comprising a source of A.C. voltage, a solid state controlled rectifier having anode, cathode and gate terminals, a fixed resistor and the field winding having a common terminal connected to one side of said A.C. voltage source, the other end of the field winding being connected to said anode terminal, an inductance and the armature winding having a common terminal connected to the other side of the A.C. voltage source, the other end of the armature winding being connected to said cathode terminal, a capacitor connected between and in series with the fixed resistor and the inductance across the source of A.C. voltage, a variable resistor connected in shunt with said capacitor and a diode connected between the gate terminal of the rectifier and the common junction of the fixed resistor and capacitor, said capacitor and inductance being in resonance at the frequency of the A.C. voltage source.

4. In a speed regulating system, the combination with an electric motor having series-connected field and armature windings of a solid state controller rectifier having anode, cathode and gate terminals, a source of A.C. voltage, a first series circuit comprising the field winding connected between one side of said source and the anode terminal and the armature winding connected between the other side of said source and the cathode terminal, a second series circuit comprising a fixed resistor connected to one side of said source, a capacitor and an inductance connected to the other side of said source, a variable resistor in shunt with said capacitor and a diode connected between the gate terminal and the common junction of the fixed resistor and the capacitor, said capacitor and inductance being substantially in resonance at the frequency of the source voltage.

No references cited.